2,793,133
Patented May 21, 1957

2,793,133

PRODUCTION OF FINELY DIVIDED BERLIN BLUE

Hans Verbeek and Eberhard Gratzfeld, Wesseling, Bezirk Koln, Germany, assignors to Chemische Fabrik Wesseling A.-G., Wesseling, Bezirk Koln, Germany No Drawing. Application December 16, 1954, Serial No. 475,827

6 Claims. (Cl. 106—304)

This invention relates to a process for the production of finely divided fillers, especially pigments.

The invention provides a process for the production of a finely divided filler by precipitation from a liquid medium, wherein the precipitation is effected in the presence of one or more of the following lacquer constituents: plasticizers, film-forming oils, high-boiling solvents and film-forming resins, whereby a coating layer is formed around the individual particles of the filler.

It is already known to disperse colouring pigments in water and to add paraffin oil and wetting agents to these dispersions in order to promote dispersibility in organic film formers and substantially to prevent the pigment particles from agglomerating especially on drying. In the same way it had already been proposed to apply a monomolecular layer of fatty acid or a fatty acid ester to previously prepared pigment particles in order to improve the covering power and lustre of the pigments when used for dyeing.

In the known processes it was not possible to influence the particle size and characteristics of the fillers and their pigments during their production by a precipitation reaction, or else the quantities of substances added were extraordinarily small. According to the present invention the precipitation is carried out in the presence of components which form a coating layer and the quantity of these components is so selected that the particles do not stick together, even after drying, and retain the character of a loose powder. Moreover a close surface layer is produced on the particles, the components of which layer can be taken up by a lacquer into which the pigments are introduced. In accordance with the invention it is preferred to add lacquer constituents, which form the surface layers during the production of the fillers or pigments, in quantities of 5 to 40% calculated on the weight of filler produced. These constituents make the pigments compatible with lacquers and themselves take part in forming the lacquer film. The addition of these lacquer constituents at the stage where the fillers or pigments are being produced ensures that the coating layers are bound to the pigments not only mechanically. In some cases the coating layer is incorporated chemically by saturation of free valencies on the surface of the pigment particle. Through the intermediary of the surface layer the pigments or fillers are better bound to the rubber or lacquer in which the pigments are to be incorporated, so that excellent lacquer films or vulcanisates are produced.

Plasticizers are the preferred lacquer constituents to be added to form the surface coatings during the precipitation of the fillers or pigments. The plasticizers may be natural fats and oils, for example castor oil, or esters of phthalic acid with aliphatic alcohols, such as dibutyl phthalate or cyclohexyl phthalate. Esters of polyhydric alcohols with other acids, especially unsaturated aliphatic acids such as oleic acid, ricinoleic acid or linoleic acid, can be used and also polyesters, such as adipic acid glycol esters. Alcohols, for example glycerine, or low-molecular weight polyethylene glycols can also be selected from among the known plasticizers for the purpose of the invention.

Various film-forming synthetic resins can also be employed with success. The resins employed should not form hard brittle surface layers which would hinder the incorporation of the fillers or pigments in rubber, lacquers or oils. For this reason the so-called soft resins of the type of polyester resins have proved most suitable; but hard resins can be added to the reaction mixtures from which the pigments are precipitated, provided that provision is made for the presence of suitable plasticizers.

Similar considerations apply to the choice of the film-forming oils. Film-forming oils which dry oxidatively and thus can form hard surface layers must not be used.

High-boiling lacquer solvents with boiling points of at least 150° C. can be added to the reaction mixture alone or in admixture with the resins and other lacquer constituents. Amongst the high-boiling lacquer solvents it is preferred to use glycols and glycol derivatives, and esters and higher alcohols which boil above 150° C. Mineral oils and corresponding solvent mixtures are also suitable.

The finely divided substances which are provided according to the invention with a surface coating have proved suitable as fillers of all kinds, for example for rubber and other elastomers, especially reinforcible elastomers. Not only do they retain their primary particle size during the precipitation, but also they have an organophilic surface layer, even when they themselves are inorganic substances, and hence can be incorporated in organic substances readily and well. They are not only satisfactorily distributed but also wetted excellently. In the case of substances of hydrophilic character the character of the surface is reversed, so that in many cases desired hydrophobic properties can be imparted to them.

These properties are above all of importance when using coloured fillers produced by the process of the invention in lacquers. The choice of lacquer constituents to form the surface layer makes it possible to employ these constituents in relatively large quantities of between 5 and 40% of the pigment, since when the pigments are incorporated in lacquers the surface layers are taken up by and incorporated in the lacquers. It is, therefore, not necessary to use these surface coating formers in very small quantities only, as was the case with the surface coating formers which were used in previously known processes and would otherwise have had an unfavourable influence on the properties of the lacquer. Such disadvantageous effects are not to be feared in the process of the invention; on the contrary one or other of the constituents which is introduced with the pigment may be used in correspondingly reduced quantities when making up the lacquer composition. For example less than sufficient of a plasticizer may be added to a lacquer when a pigment is to be used having particles provided with a surface coating layer of a lacquer plasticizer.

The advantageous results to be obtained by the process according to the invention are demonstrated by the fact that this process is particularly suitable for the production of Berlin blue. It is known that it is extraordinarily difficult to produce finely divided Berlin blue which is satisfactory for dyeing purposes and can be dispersed well. It has been found, however, that excellent products are obtained when lacquer constituents, especially lacquer plasticisers, are added to the reaction mixture during the reaction of the ferrous salt solution with potassium or sodium ferrocyanide, i. e. during the actual formation of the so-called Berlin white. Under these conditions an extraordinarily finely divided material is precipitated, which shows no tendency to agglomerate since the coating has already been formed on the particles of ferroferrocyanide.

Surprisingly this coating, which is extraordinarily effective to prevent agglomeration and to form a carbophilic surface layer on the particles, does not appreciably hinder the further working up into Berlin blue. In particular the oxidation of the particles is not hindered or interfered with. In cases where the coatings are too thick or too compact, the oxidation conditions can, of course, be varied and adapted to the particular condition of the Berlin white.

The following examples illustrate the process of the invention:

Example 1

20% of dibutyl phthalate, calculated on thhe Berlin blue to be produced, are added to a ferrocyanide salt solution. An oil-in-water emulsion is produced by strong stirring and a ferrous salt solution is added to this emulsion to bring about the precipitation. The ferroferrocyanide produced (Berlin white) is then oxidised by methods known per se in the production of Berlin blue and the pigment is dried as usual. An extraordinarily finely divided Berlin blue is produced which can be worked up with excellent results for the production of coloured lacquers.

Example 2

15% of castor oil, calculated on the Berlin blue, is introduced into the reaction mixture of Example 1 in place of the dibutyl phthalate. The mixture is emulsified and the emulsion is precipitated as in Example 1.

Example 3

A condensation product of cyclohexanone and methyl cyclohexanone is mixed with the same quantity of glycollic acid butyl ester at 100° C. and worked up with heating into an emulsion with the help of an emulsifier. This emulsion is added to a solution of ferrous sulphate which is thereafter precipitated with sodium ferrocyanide. The finely divided white precipitation product produced is oxidised in the manner usual for the production of Berlin blue, separated from the liquid and dried. This method of operation also productes an extraordinarily finely divided Berlin blue of deep colour, which can be incorporated satisfactorily in lacquers.

Example 4

The procedure of Example 3 is repeated but the resin plasticised with dibutyl phthalate is replaced by this high-boiling solvent alone in a quantity of 25%, calculated on the Berlin blue.

Example 5

Working as described in Examples 3 and 4, the precipitation of the ferrous salt with ferrocyanide is effected in the presence of 20% of soft resin. The soft employed is an oil-free polyester of the type of phthalic acid glyceride.

Example 6

A mixture of synthetic resin and a high-boiling solvent (one part of a condensation product of cyclohexanone and methyl cyclohexanone and one part of glycollic acid butyl ester) is added to a solution of sodium carbonate of specific weight 1.052. The dispersion so produced is precipitated by the addition of an aluminum sulphate solution of specific weight 1.075. A carbophilic, readily dispersible, transparent hydrated alumina is produced which can be used as a filler or pigment for coloured lacquers or printing inks. The mixture of synthetic resin and high-boiling solvent is added in a proportion of 10% of the hydrated alumnia.

Example 7

A calcium chloride solution of specific weight 1.052 is precipitated at 95° C. with a solution of sodium silicate. The specific weight of the latter solution is 1.116 and the molecular ratio $Na_2O:SiO_2$ is 1:3.3. 10% of dibutyl phthalate, calculated on the calcium silicate to be produced, is emulsified in the sodium silicate solution. A soft carbophilic calcium silicate is produced which can be used as a reinforcing filler for rubber and also as a pigment for lacquers.

Example 8

The procedure of Example 7 is repeated but the calcium chloride is replaced by a solution of aluminium sulphate. An excellent finely divided aluminium silicate is produced.

Example 9

A solution of sodium silicate of the composition described in Example 7 is treated with 5% of mineral oil to form an emulsion which is precipitated at 90° C. with sulphuric acid of specific weight 1.052. A very finely divided pure silica is produced which can readily be dispersed and is a valuable reinforcing filler for rubber.

Example 10

For the production of chrome yellow a sulphuric acid solution of sodium bichromate is used in which the ratio of bichromate to sulphuric acid is 70:50. A second solution is produced with appropriate dilution from 224 parts of litharge and 25 parts of 80% acetic acid, and 10% glycollic acid butyl ester, calculated on the pigment to be produced, is emulsified in this solution. The chromate solution is precipitated with the litharge-containing solution to give a carbophilic bright chrome yellow which can readily be worked up. The fineness of division of the pigment is increased to an extraordinary degree by the addition of the glycollic acid butyl ester as compared to a pigment produced without this addition.

Example 11

A red azo dyestuff (Permanentrot) is produced by diazotising 2.4 parts of dinitro-aniline in sulphuric acid solution at 20° C. A solution of β-naphthol in alcohol containing 10% of dibutyl phthalate, calculated on the finished dyestuff, is added to this sulphuric acid diazo solution with stirring and cooling in ice. The solutions are brought together so slowly that the temperature does not exceed 5° C. A very soft red organic dyestuff is produced which can readily be worked up and dispersed.

What we claim is:

1. In a process for the production of Berlin blue pigment by precipitation of Berlin white from a reaction solution comprising a ferrous salt and an alkali metal ferrocyanide and oxidation of said Berlin white to produce Berlin blue, the steps which comprise incorporating in the liquid reaction solution 5 to 40%, calculated on the weight of the pigment produced, of an organic lacquer constituent selected from the group consisting of lacquer plasticizers, non-oxidative-drying film forming lacquer oils, high-boiling lacquer solvents and film forming lacquer resins effecting the precipitation of Berlin white from the reaction solution in the presence of said lacquer constituent to provide a coating of said lacquer constituent on the Berlin white as it is precipitated and oxidizing said coated Berlin white to Berlin blue.

2. The process of claim 1 in which said lacquer constituent is dibutyl phthalate.

3. The process of claim 1 in which said lacquer constituent is castor oil.

4. A Berlin blue pigment produced according to claim 1.

5. A Berlin blue pigment produced according to claim 2.